(12) United States Patent
Wilson et al.

(10) Patent No.: US 8,671,339 B2
(45) Date of Patent: Mar. 11, 2014

(54) SYSTEM, METHOD AND COMPUTER PROGRAM PRODUCT FOR ASSET SHARING AMONG HIERARCHICALLY INTERCONNECTED OBJECTS

(75) Inventors: Robin D. Wilson, Buda, TX (US); Dennis C. Heideman, Buda, TX (US); Daniel Yee, Austin, TX (US); Robert Scott Dickerson, Austin, TX (US)

(73) Assignee: Open Text S.A., Luxembourg (LU)

(*) Notice: Subject to any disclaimer, the term of this patent is extended or adjusted under 35 U.S.C. 154(b) by 95 days.

(21) Appl. No.: 12/986,965

(22) Filed: Jan. 7, 2011

(65) Prior Publication Data
US 2011/0106888 A1 May 5, 2011

Related U.S. Application Data

(63) Continuation of application No. 09/989,814, filed on Nov. 20, 2001, now Pat. No. 7,904,804.

(51) Int. Cl.
*G06F 15/00* (2006.01)

(52) U.S. Cl.
USPC ........... 715/234; 715/200; 715/760; 715/704; 707/704; 707/634; 707/639

(58) Field of Classification Search
CPC .................................................. G06F 9/4433
USPC .......... 707/651, 778, 786, 829; 715/200, 234, 715/651, 778, 786, 829
See application file for complete search history.

(56) References Cited

U.S. PATENT DOCUMENTS

| | | |
|---|---|---|
| 5,983,227 A | 11/1999 | Nazem et al. |
| 6,185,587 B1 | 2/2001 | Bernardo et al. |
| 6,185,591 B1 | 2/2001 | Baker |
| 6,463,460 B1 | 10/2002 | Simonoff |
| 6,529,910 B1 | 3/2003 | Fleskes |
| 6,557,013 B1 | 4/2003 | Ziff et al. |
| 6,601,057 B1 | 7/2003 | Underwood et al. |
| 6,697,825 B1 | 2/2004 | Underwood et al. |
| 6,704,743 B1* | 3/2004 | Martin .......................... 707/786 |
| 6,857,012 B2 | 2/2005 | Sim et al. |
| 6,873,995 B2 | 3/2005 | Benson et al. |

(Continued)

OTHER PUBLICATIONS

Official Action for U.S. Appl. No. 10/681,710 mailed Dec. 5, 2012, 9 pages.

(Continued)

*Primary Examiner* — Cesar Paula
*Assistant Examiner* — Mohammed-Ibrahim Zuberi
(74) *Attorney, Agent, or Firm* — Sprinkle IP Law Group

(57) ABSTRACT

In some embodiments, a parent object may share its assets with its descendent(s) in a hierarchical asset sharing model. The hierarchical asset sharing model may specify a plurality of asset sharing modes. In a first mode, an asset of the parent is imposed on a child. The child is able to utilize the asset, but unable to modify or delete the asset. In a second mode, the child is able to utilize the asset and a copy of the asset is generated when the child attempts to modify the asset. The child can modify the copy of the asset, which is stored as an asset only of the child. The original asset is no longer shared becomes an asset only of the parent. In a third mode, both the parent and the child can utilize and modify the asset.

23 Claims, 4 Drawing Sheets

(56) References Cited

U.S. PATENT DOCUMENTS

| | | | |
|---|---|---|---|
| 6,874,001 | B2 | 3/2005 | Narang et al. |
| 6,904,454 | B2 | 6/2005 | Stickler |
| 6,983,288 | B1 | 1/2006 | Kirkwood et al. |
| 7,013,313 | B1 * | 3/2006 | LaRue ................................ 1/1 |
| 7,130,885 | B2 | 10/2006 | Chandra et al. |
| 7,152,207 | B1 | 12/2006 | Underwood et al. |
| 7,167,903 | B2 | 1/2007 | Percival |
| 7,325,193 | B2 | 1/2008 | Edd et al. |
| 7,475,346 | B1 | 1/2009 | Bullock et al. |
| 7,668,913 | B1 | 2/2010 | Underwood et al. |
| 7,779,352 | B1 | 8/2010 | Underwood et al. |
| 7,865,819 | B2 | 1/2011 | Wilson |
| 7,886,221 | B1 | 2/2011 | Underwood et al. |
| 7,904,799 | B1 | 3/2011 | Underwood et al. |
| 7,904,804 | B1 | 3/2011 | Wilson |
| 8,136,027 | B2 | 3/2012 | Underwood et al. |
| 2002/0078140 | A1 | 6/2002 | Kelly et al. |
| 2002/0103933 | A1 | 8/2002 | Garon et al. |
| 2002/0138582 | A1 | 9/2002 | Chandra et al. |
| 2002/0165944 | A1 | 11/2002 | Wisner et al. |
| 2003/0051164 | A1 | 3/2003 | Patton |
| 2004/0199867 | A1 | 10/2004 | Brandenborg |
| 2006/0200751 | A1 | 9/2006 | Underwood et al. |
| 2008/0109472 | A1 | 5/2008 | Underwood et al. |
| 2010/0205551 | A1 | 8/2010 | Underwood et al. |
| 2010/0306644 | A1 | 12/2010 | Underwood et al. |

OTHER PUBLICATIONS

Office Action for U.S. Appl. No. 10/681,710, mailed Jun. 24, 2013, 12 pgs.
Office Action for U.S. Appl. No. 10/681,710, mailed Mar. 30, 2006, 11 pgs.
Surjanto B., Ritter N., Loeser J., XML Content Management based on Object-Relational Database Technology, IEEE, May 2000, pp. 70-79.
Office Action for U.S. Appl. No. 10/681,710, mailed Aug. 16, 2006, 11 pgs.
Appeal Brief for U.S. Appl. No. 10/681,710, filed May 22, 2007, 31 pgs.
Examiner's Answer for U.S. Appl. No. 10/681,710, mailed Sep. 25, 2007, 14 pgs.
Reply Brief for U.S. Appl. No. 10/681,710, filed Nov. 6, 2007, 18 pgs.
Decision for U.S. Appl. No. 10/681,710, mailed Jun. 21, 2012, 11 pgs.
Using Paradox 5 for Windows special edition, QUE, 1994 pp. 326-331, and 525-537.
Yahoo! Mail-Online Support, help pages, Archive.org, 2000, 23 pages.
Office Action issued in U.S. Appl. No. 09/989,814, mailed Oct. 5, 2004, 11 pages.
Office Action issued in U.S. Appl. No. 09/989,814, mailed May 18, 2005, 11 pages.
Office Action issued in U.S. Appl. No. 09/989,814, mailed Sep. 26, 2005, 15 pages.
MyYahoo.com Help Pages Pages, Archive.org, 1999, 19 pages.
Office Action issued in U.S. Appl. No. 09/989,814, mailed Mar. 15, 2006, 15 pages.
Office Action issued in U.S. Appl. No. 11/212,937, mailed Jun. 16, 2006, 10 pages.
Office Action issued in U.S. Appl. No. 09/989,814, mailed Sep. 15, 2006, 15 pages.
Office Action issued in U.S. Appl. No. 11/212,937, mailed Dec. 5, 2006, 12 pages.
Examiner's Answer to Appeal Brief issued in U.S. Appl. No. 09/989,814, mailed Aug. 24, 2007, 17 pages.
Examiner's Answer to Appeal Brief issued in U.S. Appl. No. 11/212,937, mailed Oct. 16, 2007, 13 pages.
Decision on Appeal issued in U.S. Appl. No. 09/989,814, mailed Jan. 30, 2009, 26 pages.
Office Action issued in U.S. Appl. No. 09/989,814, mailed Jun. 3, 2009, 16 pages.
Web Characterization Terminology & Definitions Sheet, W3C Working Draft, dated May 24, 1999. Downloaded from the Internet on Feb. 12, 2010 at http://www.w3.org/TR/ (10 pages).
Yahoo! Home Page, and Source Code for Yahoo! Home Page dated Jan. 1999. Downloaded from the Internet on Feb. 24, 2010, 5 pages.
MyYahoo! Front Page, and Source Code for MyYahoo! Front Page, dated Jan. 1999. Downloaded from the Internet on Feb. 24, 2010 at http://web.archive.org/web/19990125091014/my.yahoo.com/, 12 pages.
Decision on Appeal issued in U.S. Appl. No. 11/212,937, mailed Feb. 2, 2010, 12 pages.
Office Action issued in U.S. Appl. No. 09/989,814, mailed Dec. 4, 2009, 73 pages.
Dunigan, et al., "MCSC Training Guide: Windows NT Workstation 4.0," New Riders Publishing, 1997, pp. 141-192.
Office Action issued in U.S. Appl. No. 09/989,814, mailed Apr. 13, 2010, 20 pages.
Office Action issued in U.S. Appl. No. 11/212,937, mailed Apr. 12, 2010, 12 pages.
Notice of Allowance for U.S. Appl. No. 09/989,814, mailed Aug. 20, 2010, 6 pages.
Notice of Allowance for U.S. Appl. No. 11/212,937, mailed Aug. 31, 2010, 6 pages.
Notice of Allowance for U.S. Appl. No. 09/989,814, mailed Oct. 28, 2010, 6 pages.
Office Action issued for U.S. Appl. No. 10/681,710, mailed Oct. 22, 2013, 13 pages.

* cited by examiner

| None | Impose | Inherit | Co-Own | Child Site (ID) |
|---|---|---|---|---|
| ○ | ○ | ○ | ○ | |
| ○ | ○ | ● | ○ | East Coast Review (18416) |
| ○ | ● | ○ | ○ | Pacific Herald (18466) |
| ○ | ○ | ○ | ● | Worldwide Media International (18516) |
| ● | ○ | ○ | ○ | Canada Times (18616) |
| ● | ○ | ○ | ○ | Journal Fancais (18666) |
| ● | ○ | ○ | ○ | Periodico de Espana (18716) |
| ● | ○ | ○ | ○ | Worldwide Media Television (18566) |
*FIG. 7*
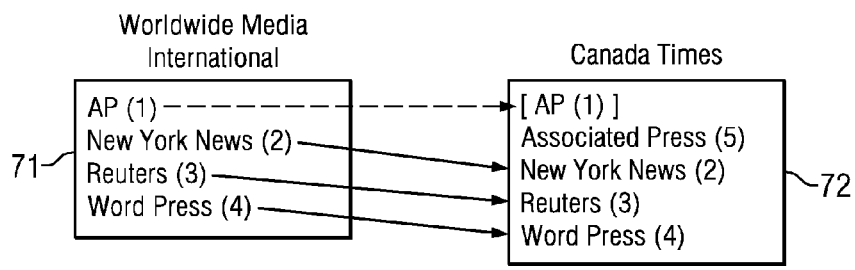
*FIG. 9*
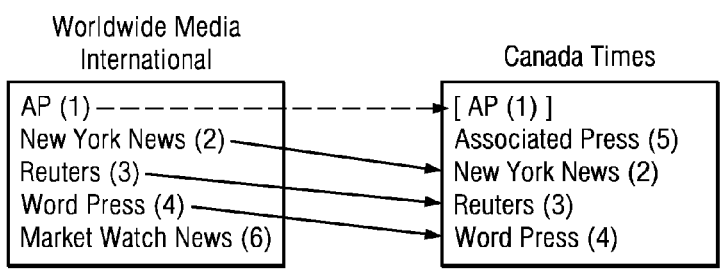
*FIG. 10*

SYSTEM, METHOD AND COMPUTER PROGRAM PRODUCT FOR ASSET SHARING AMONG HIERARCHICALLY INTERCONNECTED OBJECTS

CROSS-REFERENCE TO RELATED APPLICATION

This is a continuation of U.S. patent application Ser. No. 09/989,814, filed Nov. 20, 2001 now U.S. Pat. No. 7,904,804, now allowed, entitled "SYSTEM AND METHOD FOR WEB SITES IN HIERARCHICAL RELATIONSHIP TO SHARE ASSETS," which is fully incorporated by reference herein. This application relates to U.S. patent application Ser. No. 11/212,937, filed Aug. 25, 2005, issued as U.S. Pat. No. 7,865,819, entitled "HIERARCHICAL ASSET SHARING MODEL FOR SHARING ASSETS IN A WEB SITE SYSTEM," which is a continuation of U.S. patent application Ser. No. 09/989,814. Contents of applications referenced herein are hereby incorporated in their entireties for all purposes.

TECHNICAL FIELD

This disclosure relates generally to asset sharing, and more particularly to a system, method, and computer program product for sharing assets among hierarchically interconnected objects.

DESCRIPTION OF RELATED ART

More and more companies are taking advantage of e-commerce channels to communicate sales and marketing information to potential customers. One of the ways this is done is by creating web sites for the companies which are accessible through the Internet.

Although a web site may appear to be a very simple mechanism for distributing information, it can be very complicated to construct. The more information a company wishes to provide to customers through its web site, the more complicated the web site becomes. Interestingly, features which are intended to make the web site easier for visitors to use often require increased complexity in the structure of the web site. This leads to increased difficulty in the construction, maintenance and management of the web site.

One of the ways in which web site structure can be complicated is through the use of different web sites which need to utilize the same assets. "Assets" may include many different features of the web sites, such as images, documents and other page layout components, as well as architectural assets such as channels and views.

Conventionally, the sharing of these assets is accomplished by either copying the assets from one web site to another, or by modifying the software for the different web sites specifically to enable them to share assets. The first of these options, copying the assets, is relatively easy to accomplish, it does not really achieve the sharing of the assets. Put another way, each web site has its own domain and a set of assets. Each asset is initially identical, but which may later diverge. Copying does not result in a common set of assets which is accessible by both web sites having different domain names.

The second option, modification of the software for the web sites to enable them to share assets, can achieve the desired functionality, but at a relatively high cost. The programming effort which is required to modify the software can be tremendous, and is typically far too great to be justified by the resulting asset sharing between just a few web sites. Even if this option were not so costly, this type of programming effort is normally beyond the capabilities of the web site operators, who generally either purchase the software or contract out the development of the software.

SUMMARY

One or more of the problems outlined above may be solved by the various embodiments of the invention. Broadly speaking, the invention comprises systems and methods for enabling the parent in a hierarchically organized pair of objects to allow the child to share access to selected assets. In one embodiment, the assets are shared in one of three modes: an IMPOSE mode; an INHERIT mode; and a CO-OWN mode. (Some assets may not be shared, which may be considered a fourth mode.) In the IMPOSE mode, the parent allows the child to utilize the asset, but not to modify it. In the CO-OWN mode, the parent and child have equal rights to access the asset, including the right to modify it. In the INHERIT mode, both the parent and child have equal rights to access the asset, including the right to modify it, but if the child attempts to modify the asset, it actually gets a copy of the asset, which it then modifies. The asset is no longer a single asset shared between the parent and child.

In a preferred embodiment, the invention is implemented in a system of web sites. The parent object may be a web site, or it may be a system administrator. Assets can be shared between multiple parent-child pairs, but they are shared on a pair by pair basis. The shared assets may include channels, views, articles, images, files, etc. The assets may be shared in sets, or they may be shared individually. If a set of assets is shared in the INHERIT mode, an attempt by the child to modify one of the assets will result in the assets being shared individually, rather than as a set. Then, the asset which is modified will exist as an original asset accessible by the parent and a modified copy accessible by the child. The remaining assets will still be shared by parent and child in the INHERIT mode. A single parent may share assets differently with one child than with another child.

An alternative embodiment of the invention comprises a method for sharing assets in a hierarchy of objects. The method comprises providing a pair of objects which are related as parent and child, then enabling the parent to share its assets with the child in one of the three modes described above (IMPOSE, INHERIT and CO-OWN).

Another alternative embodiment of the invention comprises a software application which implements a method for sharing assets in a hierarchy of objects. The software application provides a basis for enabling a group of objects to share assets in the manner described above, without having to make copies of the assets or re-write the software code for the objects to enable them to share assets. The software application defines a base asset class which contains the methods and properties that provide the asset sharing functionality. The software application further defines one or more asset classes which inherit the asset sharing functionality from the base class. ("Inherit" is used here in the object oriented programming context.)

The software application may be embodied in a computer-readable medium such as floppy disks, CD-ROMs, DVD-ROMs, RAM, ROM, database schemas and the like. The computer readable medium contains instructions which are configured to cause a computer to execute a method which is generally as described above. It should be noted that the computer readable medium may comprise a RAM or other memory which forms part of a computer system. The computer system would thereby be enabled to perform asset sharing as described above.

Numerous alternative embodiments are also possible.

BRIEF DESCRIPTION OF THE DRAWINGS

Other objects and advantages of the invention may become apparent upon reading the following detailed description and upon reference to the accompanying drawings.

FIG. 7 is an illustration of a web page configured to control the sharing of sets of assets in one embodiment.

FIG. 9 is a diagram illustrating the sharing of a set of content provider assets in one embodiment after a child object attempts to modify an asset shared in the INHERIT mode.

FIG. 10 is a diagram illustrating the sharing of a set of newly added content provider assets in one embodiment after a child object has modified an asset shared in the INHERIT mode.

Figure 1:
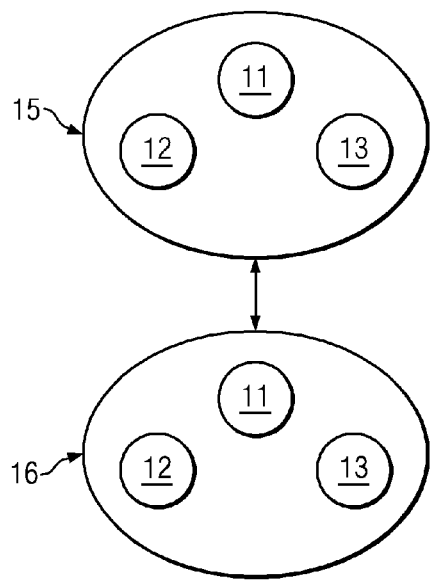
FIG. 1 is a diagram illustrating the sharing of a set of assets between a parent object and a child object.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION

This disclosure provides systems and methods for implementing a hierarchical asset sharing model in hierarchical systems such as web site systems. A preferred embodiment is described below. It should be noted that this and any other embodiments described below are exemplary and are intended to be illustrative of the invention rather than limiting.

In one embodiment of the hierarchical asset sharing model, the parent of a parent-child pair can grant access to one or more of its assets to the child using several different access modes. In a first mode, the parent imposes its asset on the child. That is, it allows the child to utilize the asset, but not to modify it. In a second mode, the parent allows the child to have equal rights to access the asset, including the right to modify it. In a third mode, both the parent and child have essentially equal rights to access the asset. Both can utilize the asset, and both have the apparent right to modify it. If the parent attempts to modify the asset, the modified asset is shared between the parent and child. If the child attempts to modify the asset, it actually gets a copy of the asset, which it then modifies. The originally shared asset is no longer shared, and is an asset only of the parent, while the modified copy is an asset only of the child.

While the three modes described above will be referred to herein as the IMPOSE, CO-OWN and INHERIT modes, respectively, these labels have been selected for the convenience of the reader, and any label (or even no labels at all) may be used in a given embodiment of the invention.

Referring to FIG. 1, a diagram illustrating the sharing of a set of assets between a parent and child is shown. In this figure, the assets of the parent are indicated by the reference numerals 11-13. These assets belong to the set of assets 15 of the parent. The set of assets is shared with the child, so that the entire set is available to the child. Assets 11-13 are therefore within the set of assets 16 of the child. (It should be noted that the child does not actually contain a second instance of the assets, but instead has references to the parent's assets.)

The set of assets 15 can be shared in any of the three sharing modes which will be described herein as "IMPOSE", "INHERIT" and "CO-OWN". These modes will be described in detail below.

Figure 2:
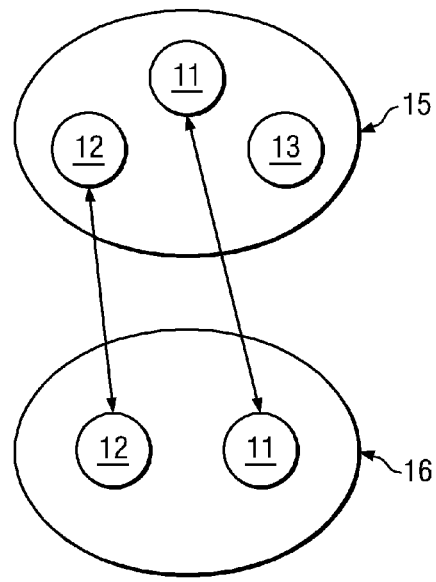
FIG. 2 is a diagram illustrating the sharing of individual assets between a parent object and a child object.

Referring to FIG. 2, a diagram illustrating the sharing of individual assets between a parent and child is shown. In this figure, less than all of assets 11-13 are shared by the parent with the child. Thus, while the parent has available assets 11-13, only assets 11 and 12 are shared with the child. Since assets 11 and 12 are shared individually, each may be shared in its own mode. For example, asset 11 might be shared in the IMPOSE mode, while asset 12 might be shared in the INHERIT mode.

It should be noted that the shared assets can comprise only a portion of the total assets of either the parent or the child. The sharing of only a portion of the parent's assets can be seen in FIG. 2, where assets 11 and 12 are shared, but asset 13 is not. It may also be the case that the child has assets other than those which are shared with it by the parent. For example, in the case of an asset which is initially shared in the INHERIT mode, if the child attempts to modify it, the asset is copied and the copy is modified. The child then has an asset which is not available to the parent. The separate assets of the child may, of course, also be obtained through other mechanisms (e.g., they may initially be defined as separate assets of the child).

Figure 3:
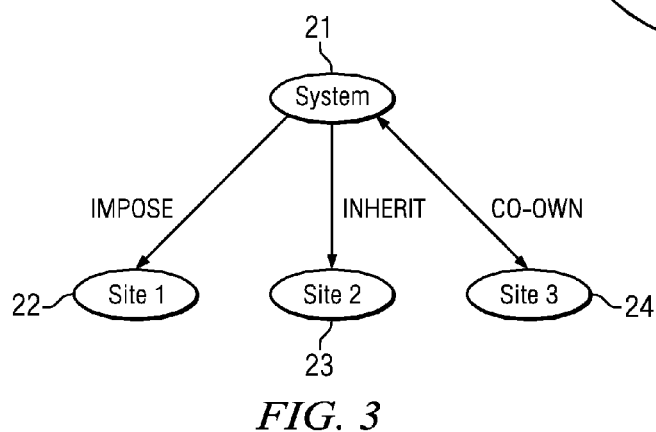
FIG. 3 is a diagram illustrating the different modes of sharing assets in one embodiment.

Referring to FIG. 3, a diagram illustrating the different modes of sharing assets is shown. In this figure, parent object 21 is interconnected to child objects 22-24. (Child objects may also be referred to herein simply as children.) The parent shares its assets with each of the children in a different mode. (It should be noted that it is not necessary to use a different mode with each child—any of the modes can be used with any of the children.)

In FIG. 3, parent 21 shares its assets with child 22 in the IMPOSE mode. This mode is depicted by the unidirectional arrow extending from parent 21 to child 22 to indicate that only the parent can modify the assets. While child 22 can use the assets, control of the assets is retained by parent 21. Parent 21 shares its assets with child 24, on the other hand, in a CO-OWN mode. In this mode, in addition to sharing the utilization of the assets, the parent and child share control of the assets. This is indicated by the bidirectional arrow between parent 21 and child 24. Child 24 is therefore able to modify the assets. The assets are utilized by both parent 21 and child 24 after they have been modified by either the parent or the child. Similarly, if parent 21 shares one of these assets with another child, that child also uses the modified asset, regardless of whether it was modified by the parent or the other child.

While the IMPOSE and CO-OWN modes are relatively straightforward, the INHERIT mode is more complicated. Parent 21 shares assets with child 23 using the INHERIT mode. The INHERIT mode is similar to the CO-OWN mode in that both parent 21 and child 24 can freely utilize the assets and, initially, both have rights to modify the assets. The INHERIT mode is distinctive, however, in that child 23 cannot actually modify the shared assets. When child 23 attempts to modify one of the assets, a copy of that asset is created for use by the child. Thus, there are two copies of the same asset (which was previously shared between the parent and the child). The child then modifies its own copy of the asset. Thereafter, child 23 utilizes its modified copy of the asset rather than the shared asset. Parent 21 continues to use the asset which it originally shared with child 23. If this asset is shared with any other children, those children continue to use the asset of parent 21.

Figure 4:
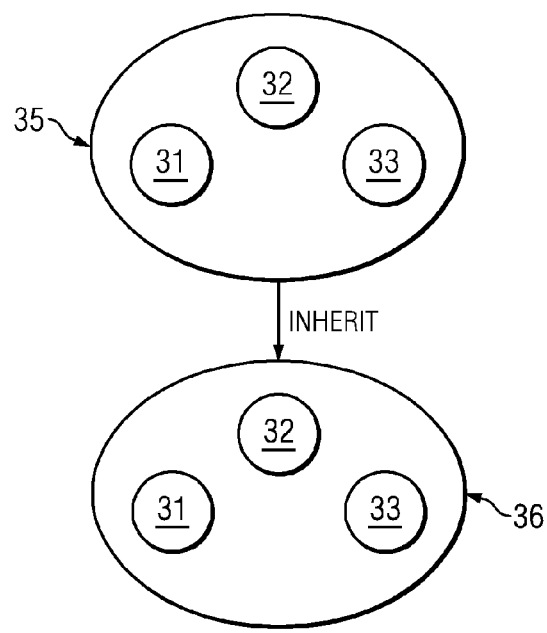
FIG. 4 is a diagram illustrating the sharing of a set of assets between a parent object and a child object in one embodiment.
Figure 5:
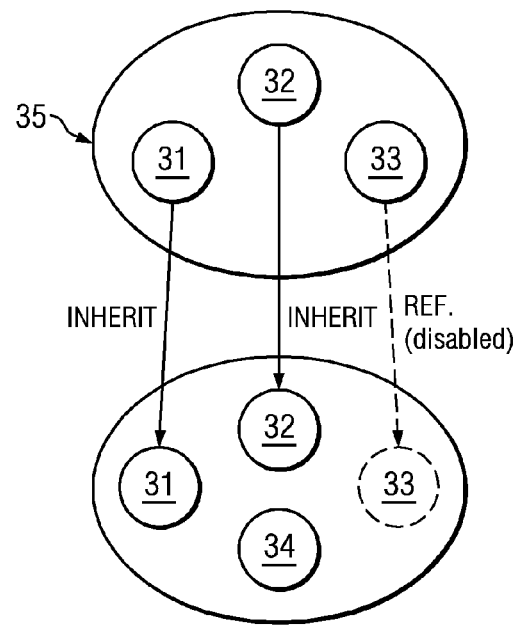
FIG. 5 is a diagram illustrating the altered relationship between the assets of the parent and the assets of the child after the child has modified one of the shared assets.

It should be noted that, if a group of assets is shared by the parent and child in the INHERIT mode, modification of one of the assets in the group will cause that asset to be copied and separately utilized by the parent and child, but will not prevent the other assets in the group from being shared. Referring to FIGS. 4 and 5, the change in the sharing relationship between the parent and child upon modification of an asset by the child is shown.

FIG. 4 illustrates the sharing of a set of assets between the parent (at the top of the figure) and the child (at the bottom of the figure). Assets 31-33 form a set of assets 35 which are available to the parent. Assets 31-33 also form a set of assets 36 which are available to the child. The bidirectional arrow between set 35 and set 36 indicates the sharing of all the assets within the set(s). Typically, the assets will be of the same type (e.g., images or channels) so that they are conveniently shared as a group. This may reduce the resources which are required for overhead and housekeeping related to the sharing of the assets.

FIG. 5 illustrates the altered relationship between the assets of the parent and the assets of the child after the child has modified one of the shared assets. In this instance, asset 33 has been modified by the child. It should be noted that the sharing relationship no longer exists between set 35 and set 36. Instead, individual sharing relationships exist as to individual assets. Specifically, assets 31 and 32 are still shared between the parent and child. Because the child attempted to modify asset 33, however, a copy 34 of the asset was created for the child, and only this copy was modified. Thus, the available assets of the parent comprise assets 31-33, while the assets available to the child comprise assets 31, 32 and 34.

It should be noted that the INHERIT mode is not associated with the concept of inheritance as used in object-oriented programming. "INHERIT" is simply used to identify the mode because it is somewhat suggestive of the corresponding manner in which assets are shared.

The various embodiments of the invention may take various forms, and need not be confined to the sharing of assets only among web sites. The scope of this disclosure is intended to encompass all such embodiments.

Although the invention may comprise many different embodiments, a preferred embodiment is implemented in a web site system. A web site has a number of assets which are associated with it. For example, it may have content assets such as articles, images, files, etc., or it may have site structure assets, such as channels, views, content providers, workflows and so on. This web site may be part of an enterprise system which includes a number of other web sites. Consequently, it may be desirable to share assets across these sites in order to make the most efficient use of the assets.

As described above, it is not easy to share assets using conventional means (e.g., by making copies of the assets or by modifying the code of the web site). It is therefore useful to implement the hierarchical asset sharing model of the present invention to achieve this capability.

In one embodiment, the hierarchical asset sharing model is implemented in a software application designed to provide infrastructure for deploying an enterprise-level portal. The application is designed to enable businesses to configure, customize and deploy portal applications. These portal applications may be used for purposes such as sales and business collaboration, channel management and employee relations.

The application uses browser-based management dashboards and reporting consoles to enable an administrator to manage the various sites in a business' system. Asset sharing is managed in the application through a site management console. The site management console includes individual management pages for each type of asset. For example, channels are managed through a channel management page, views are managed through a view management page, and so on.

The sharing of assets is managed on a site-by-site basis. Assets can be shared in different ways on different sites. For instance, a parent site may share channels, but not views with one child site, while sharing your views, but not channels with another child site. In this application, a particular site can only share assets with its direct descendents in the hierarchical structure of the sites. Assets cannot be shared with parent or sibling sites.

The application defines four modes for sharing assets: IMPOSE; INHERIT; CO-OWN; and NONE. Here, NONE is considered a sharing mode, even though no assets are shared. This allows a user to explicitly indicate that a particular asset or set of assets is not shared. Each of these modes is described in more detail in the following table.

| | |
|---|---|
| IMPOSE | The specified asset of the parent is imposed on the child site. The child site uses the assets as-is, and cannot modify or delete the asset. Furthermore, the child site cannot remove its own reference to the asset. |
| INHERIT | The child site can use the asset as-is. Changes made to the asset by the parent are reflected at the child site. If the child site wishes to modify the asset, the modifications are made to a copy of the asset, which is then stored by the child site. The reference to the original asset is also retained by the child site in this embodiment, but it is disabled. (The child site can re-enable the reference to the original asset if necessary.) |
| CO-OWN | The child site can use, modify or delete the asset. Modifications or deletions by the child site are reflected at the parent site, and modifications or deletions by the parent site are reflected at the child site. (Likewise, these modifications or deletions are reflected at other child sites which share the asset.) |
| NONE | The child site does not share the asset with the parent site. |

The application is configured to share assets either individually, or in sets as described above. In this particular implementation, however, the sharing of a set may result in a limitation on the child site. For example, if the set of channels is shared, the child may be prevented from creating additional assets of that same type. If, on the other hand, the channels are shared individually, the child may create additional channels which are part of its own set of channel assets.

Although a parent site cannot share its assets with descendents beyond its children (e.g., its grandchildren), the parent site's children can share the assets with their own children. The child sites can share no more than their own rights in the assets. Put another way, the asset is shared between the child and the descendent in a mode which is no less restrictive than the mode in which the asset is shared between the parent and the child. For example, if a parent IMPOSEs an asset on its child, the child can do no more than IMPOSE the asset on the grandchild (e.g., it cannot allow its child to CO-OWN the asset). If the parent allows its child to CO-OWN the asset, the child can share the asset with its own child using any of the four sharing modes (IMPOSE, INHERIT, CO-OWN, or NONE). The application is configured to generate management pages for the child sites such that the sharing which can be performed is constrained in this manner.

Figure 6:
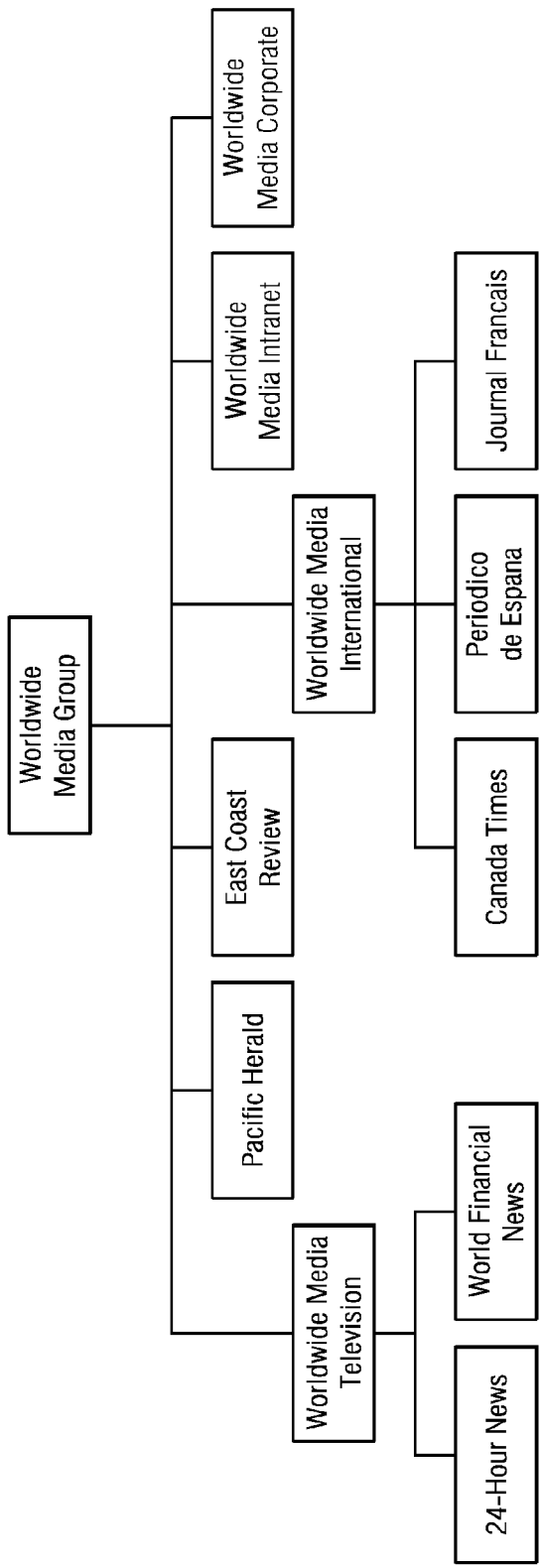
FIG. 6 is a diagram illustrating the hierarchical structure of a set of web sites operated by a business entity in one embodiment.

An example of an implementation of the hierarchical asset sharing model disclosed herein is set forth below. Referring to FIG. 6, a diagram illustrating the hierarchical structure of a set of web sites operated by a business entity ("worldwide media group") is shown. It can be seen from the figure that the web sites are structured into a three-tiered hierarchy. At the top of the hierarchy is parent site 51. This site corresponds to the enterprise-level business entity, the Worldwide Media Group. Below parent site 51 are six child sites 52-57. In the lowest level of the hierarchy, sites 58 and 59 are the children of site 52 and sites 60-62 are the children of site 55.

The site administrator of parent site 51 has the authority to set the sharing for children 52-57. In particular, the sharing of channels within the web sites will be illustrated here. It is assumed for the purposes of this example that parent site 51 shares its channel assets as follows:

| Site | Mode |
| --- | --- |
| Worldwide Media International | CO-OWN |
| East Coast Review | INHERIT |
| Pacific Herald | IMPOSE |
| Worldwide Media Television | NONE |

The channel assets of parent site 51 are shared as a set. Assets can be shared either in sets or as individual assets. An individual asset is just that—a single asset of a particular type (e.g., a single channel or image). In the present application, a set of assets includes the entire body of assets of a particular kind (e.g., all channels or all images). The set of assets includes only those assets which are available to the site which is sharing them, and all of those assets must be available for sharing in the selected mode.

When an individual asset is inherited by a child site, the child site can create additional assets of its own without affecting the behavior of the shared assets. Referring to FIG. 6, if the worldwide media international site shares a single channel called "EEC News" within the Canada Times, the Canada Times can create its own channels, "Québec headlines" and "Ottawa Headlines," without affecting the asset-sharing relationship of the "EEC News" channel. Changes which are made by the Worldwide Media International site to the "EEC News" channel are reflected at the Canada Times site.

When a set of assets is shared via the INHERIT mode, the child site is given a reference to the parent's set of assets. When the child site modifies one of the assets in the set, the asset is "copied on change." After the asset has been changed, it is no longer shared with the parent. Similarly, the set is no longer shared with the parent. The child site instead has its own set which shares some of the assets of the parent's set. Assets which are added to the parent's set will not be added to the child's set, whereas when the child shared the parent's set, assets added by the parent to its set would also be available to the child.

The sharing mode for each of the children is set in the application through a set-sharing page, as illustrated in FIG. 7. (The control page illustrated in this figure represents a specific implementation of the asset sharing model and it should be noted that the mechanism for setting the sharing mode between the parent and each child may differ in other implementations.) As a result of these settings, the child sites can access the channels of parent 51 as described below.

Worldwide Media International (CO-OWN) The channel management page of the Worldwide Media International site lists all the channels provided by a Worldwide Media Group. The Worldwide Media International site can make changes to the channels, and the changes it makes will be reflected at the Worldwide Media Group site. Because the parent site can only grant a child site an asset sharing mode equal to or less than its own sharing mode for the same asset (if the asset is shared with its parent,) Worldwide Media International is free to share these assets (CO-OWNed with parent 51) with its own child sites, Canada Times 60, Journal Francaise 61 and Periodico de Espana 62 in any way it wishes.

East Coast review (INHERIT) The channel management page of the East Coast Review site lists all the channels provided by the Worldwide Media Group site. The INHERIT share type allows the East Coast Review to change channel information on its own site, but not on the Worldwide Media Group site. Therefore, if a channel is changed at the East Coast Review, a copy of the parent's channel is created. The copy appears in addition to the parent's original channels on the child site.

Pacific Herald (IMPOSE) The channel management page of the Pacific Herald site lists all the channels from the Worldwide Media Group site. The Pacific Herald site administrator can view the details of each channel, but cannot change them. Any changes the Worldwide Media Group makes to any of the IMPOSEd channels are automatically reflected on the Pacific Herald site. The Pacific Herald site has no control over how channel assets are shared with its own child sites. If the Pacific Herald were to add any child sites, Worldwide Media Group's channels would be imposed on all of Pacific Herald's descendent sites.

Worldwide media television (NONE) The channel management page for Worldwide Media Television does not show any of the Worldwide Media Group site's channels. Worldwide Media Television is free to create its own channels. If Worldwide Media Television creates its own channels, it has full control over them and can grant its child sites any share type (sharing mode) it chooses to these assets.

It should be noted that any of the particular assets of the parent site can be shared individually. If the share type for a set of assets is NONE, the sharing of an individual asset within this set will not affect the remaining assets. If the share type for a set of assets is IMPOSE, INHERIT or CO-OWN, assignment of a different share type to one of the assets within the set will cause each of the assets to be shared individually, instead of as a set.

Figure 8:
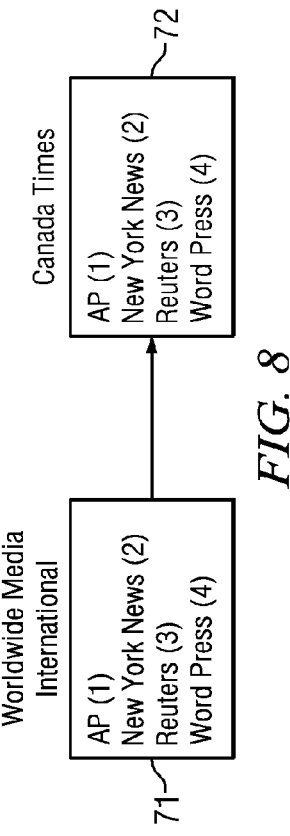
FIG. 8 is a diagram illustrating the initial sharing of a set of content provider assets in the INHERIT mode in one embodiment.

This can be illustrated with reference to the example of FIG. 6. Suppose that the Worldwide Media International site shares a set of content providers with the Canada Times site, using that INHERIT share type. This is illustrated in the diagram of FIG. 8, which shows the set 71 of content providers for the Worldwide Media International site and the set 72 of content providers for the Canada Times site. Since the set 71 of providers is shared by the Worldwide Media International site with the Canada Times site, the providers listed in each set are initially identical. If, however, the Canada Times site modifies the "AP" content provider by changing its name to "Associated Press," a copy of this asset will be made for the Canada Times site. This new asset will have the name "Associated Press." It should be noted that, although a copy of the original asset is made for the Canada Times site, a reference to the original asset is retained. Although the reference to the original asset is shown in the list of assets for the Canada Times site, this asset is disabled. (This implementation may vary in other embodiments.)

The new relationship between set 71 and set 72 is illustrated in FIG. 9. As illustrated in this figure, each of the unmodified assets is now individually shared between the sets (as indicated by the arrows between them). In set 72, disabled asset "AP" continues to reference the corresponding asset in set 71, though it is disabled (as indicated by the dotted line). The sets themselves are no longer shared. Thus, while modifications made by the Worldwide Media International site to assets "AP," "New York News," "Reuters" and "World Press" will be reflected in the corresponding assets of set 72 (the "AP" asset being disabled in set 72,) modifications to asset "Associated Press" by the Canada Times site will not be reflected at the Worldwide Media International site. Similarly, additions to set 71 will not be reflected in set 72. This is illustrated in FIG. 10. If one of the assets of set 71 which is shared with the Canada Times site is deleted, that asset will be removed from the Canada Times site. This is true whether the asset is shared individually, or as part of a shared set.

The benefits and advantages which may be provided by the present invention have been described above with regard to specific embodiments. These benefits and advantages, and any elements or limitations that may cause them to occur or to become more pronounced are not to be construed as a critical, required, or essential features of any or all of the claims. As used herein, the terms "comprises," "comprising," or any other variations thereof, are intended to be interpreted as non-exclusively including the elements or limitations which follow those terms. Accordingly, a process, method, article, or apparatus that comprises a list of elements does not include only those elements but may include other elements not expressly listed or inherent to the claimed process, method, article, or apparatus.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for sharing assets in a hierarchy of objects, comprising:
   at a computer operating in a network environment, specifying an asset of a parent object, the parent object comprising an asset sharing functionality for sharing assets of the parent object with only direct descendants of the parent object;
   at the computer, setting an asset sharing mode of the asset sharing functionality of the parent object for sharing the asset of the parent object with a child object, the child object being one of the direct descendants of the parent object;
   wherein the child object is configured to share assets of the child object with a direct descendant of the child object, the direct descendant of the child object being an indirect descendant of the parent object, and wherein the parent object is configured not to share any asset of the parent object with the indirect descendant;
   sharing the asset of the parent object with the child object;
   allowing, by the parent object operating in the asset sharing mode, the child object to utilize the asset of the parent object without modification, wherein control of the asset of the parent object is retained by the parent object; and
   when the child object attempts to modify the asset, the parent object operating in the asset sharing mode performs the following:
   generating a copy of the asset for the child object; wherein the child object is able to modify the copy of the asset; and
   specifying that the asset of the parent object is no longer shared with the child object.

2. The method according to claim 1, further comprising:
   specifying that the copy of the asset as modified by the child object is an asset only of the child object.

3. The method according to claim 1, further comprising:
   storing the copy of the asset as modified by the child object as an asset only of the child object.

4. The method according to claim 1, wherein the parent object and the child object share a plurality of assets individually, each having its own asset sharing mode.

5. The method according to claim 1, wherein the parent object and the child object share a set of assets in a single asset sharing mode.

6. The method according to claim 1, wherein the parent object is interconnected to a plurality of child objects, wherein the child object is a first child object of the plurality of child objects, and wherein the parent object shares assets with the plurality of child objects in a plurality of asset sharing modes.

7. The method according to claim 6, wherein in one of the plurality of asset sharing modes a second child object of the plurality of child objects is able to utilize a specified asset or group of assets of the parent object, and wherein only the parent object is able to modify or delete the specified asset or group of assets.

8. The method according to claim 6, wherein in one of the plurality of asset sharing modes both the parent object and a second child object of the plurality of child objects are able to utilize and modify a specified asset or group of assets of the parent object.

9. A computer program product comprising at least one non-transitory computer readable medium storing instructions translatable by at least one processor to perform:
   at a computer operating in a network environment, specifying an asset of a parent object, the parent object comprising an asset sharing functionality for sharing assets of the parent object with only direct descendants of the parent object;
   at the computer, setting an asset sharing mode of the asset sharing functionality of the parent object for sharing the asset of the parent object with a child object, the child object being one of the direct descendants of the parent object;
   wherein the child object is configured to share assets of the child object with a direct descendant of the child object, the direct descendant of the child object being an indirect descendant of the parent object, and wherein the parent object is configured not to share any asset of the parent object with the indirect descendant;
   sharing the asset of the parent object with the child object;
   allowing, by the parent object operating in the asset sharing mode, the child object to utilize the asset of the parent object without modification, wherein control of the asset of the parent object is retained by the parent object; and when the child object attempts to modify the asset, the parent object operating in the asset sharing mode performs the following:
generating a copy of the asset for the child object; wherein the child object is able to modify the copy of the asset; and
specifying that the asset of the parent object is no longer shared with the child object.

10. The computer program product of claim 9, wherein the instructions are further translatable by the at least one processor to perform:
specifying that the copy of the asset as modified by the child object is an asset only of the child object.

11. The computer program product of claim 9, wherein the instructions are further translatable by the at least one processor to perform:
storing the copy of the asset as modified by the child object as an asset only of the child object.

12. The computer program product of claim 9, wherein the parent object and the child object share a plurality of assets individually, each having its own asset sharing mode.

13. The computer program product of claim 9, wherein the parent object and the child object share a set of assets in a single asset sharing mode.

14. The computer program product of claim 9, wherein the parent object is interconnected to a plurality of child objects and wherein the parent object shares assets with the plurality of child objects in a plurality of asset sharing modes.

15. A system, comprising:
at least one processor;
at least one non-transitory computer readable medium storing instructions translatable by the at least one processor to perform:
specifying an asset of a parent object, the parent object comprising an asset sharing functionality for sharing assets of the parent object with only direct descendants of the parent object;
setting an asset sharing mode of the asset sharing functionality of the parent object for sharing the asset of the parent object with a child object, the child object being one of the direct descendants of the parent object;
wherein the child object is configured to share assets of the child object with a direct descendant of the child object, the direct descendant of the child object being an indirect descendant of the parent object, and wherein the parent object is configured not to share any asset of the parent object with the indirect descendant;
sharing the asset of the parent object with the child object;
allowing, by the parent object operating in the asset sharing mode, the child object to utilize the asset of the parent object without modification, wherein control of the asset of the parent object is retained by the parent object; and
when the child object attempts to modify the asset, the parent object operating in the asset sharing mode performs the following:
generating a copy of the asset for the child object; wherein the child object is able to modify the copy of the asset; and
specifying that the asset of the parent object is no longer shared with the child object.

16. The system of claim 15, wherein the parent object and the child object share a plurality of assets individually, each having its own asset sharing mode.

17. The system of claim 15, wherein the parent object and the child object share a set of assets in a single asset sharing mode.

18. The system of claim 15, wherein the parent object is interconnected to a plurality of child objects, wherein the child object is a first child object of the plurality of child objects, wherein the parent object shares assets with the plurality of child objects in a plurality of asset sharing modes.

19. The system of claim 18, wherein the plurality of asset sharing modes comprises a first mode, a second mode, and a third mode;
wherein in the first mode, a specified asset of the parent object is imposed on a descendant, wherein the descendant is able to utilize the specified asset of the parent object, and wherein only the parent object is able to modify or delete the specified asset;
wherein in the second mode, the descendant is able to utilize the specified asset, wherein a copy of the specified asset is generated when the descendant attempts to modify the specified asset, wherein the descendant is able to modify the copy of the specified asset, wherein the copy of the specified asset is stored as an asset only of the descendant, and wherein the specified asset is no longer shared and becomes an asset only of the parent object; and
wherein in the third mode, both the parent object and the descendant are able to utilize and modify the specified asset.

20. The system of claim 18, wherein the plurality of child objects has at least one descendant and wherein the parent object shares the assets only with the plurality of child objects and not with the at least one descendant of the plurality of child objects.

21. The method of claim 1, wherein:
the asset of the parent object comprises a file stored at a first storage location;
sharing the asset of the parent object comprises providing a reference to the file to the child object; and
generating a copy of the asset comprises generating a copy of the file and storing the copy of the file at a second storage location.

22. The method of claim 21, further comprising determining that the child object is attempting to modify the file stored at the first storage location.

23. The method of claim 21, wherein in the second storage location is remote from the first storage location.

* * * * *